United States Patent
Mizutani et al.

[11] Patent Number: 5,805,347
[45] Date of Patent: Sep. 8, 1998

[54] VARIABLE-MAGNIFICATION TELECENTRIC OPTICAL SYSTEM

[75] Inventors: Hideo Mizutani, Yokohama; Hiroshi Nishimura, Zushi; Masashi Tanaka, Yokohama, all of Japan

[73] Assignee: Nikon Corporation, Tokyo, Japan

[21] Appl. No.: 774,914

[22] Filed: Dec. 27, 1996

[30] Foreign Application Priority Data

Dec. 27, 1995 [JP] Japan ................................. 7-352984
Dec. 27, 1995 [JP] Japan ................................. 7-352985

[51] Int. Cl.$^6$ ............................ G02B 13/22; G02B 15/14
[52] U.S. Cl. ........................ 359/663; 359/679; 359/690
[58] Field of Search ............................ 359/663, 683, 359/686, 679, 690

[56] References Cited

U.S. PATENT DOCUMENTS

| | | | |
|---|---|---|---|
| 4,867,545 | 9/1989 | Wakimoto et al. | 359/663 |
| 5,118,957 | 6/1992 | Kawashima et al. | 356/394 |
| 5,218,415 | 6/1993 | Kawashima | 356/152 |
| 5,414,561 | 5/1995 | Wakimoto et al. | 359/663 |
| 5,416,562 | 5/1995 | Ota et al. | 355/53 |
| 5,510,892 | 4/1996 | Mizutani et al. | 356/139.1 |
| 5,633,721 | 5/1997 | Mizutani | 356/401 |

FOREIGN PATENT DOCUMENTS

7-294811 A 11/1995 Japan.

*Primary Examiner*—Scott J. Sugarman
*Attorney, Agent, or Firm*—Klarquist Sparkman Campbell Leigh & Whinston, LLP

[57] ABSTRACT

Lens systems are disclosed each of which providing a variable magnification telecentric optical system in which lateral magnification can be varied while maintaining constant image position and telecentricity. The lens system comprises, from the object side, first, second, and third lens groups disposed on an optical axis. The first and third lens groups each have positive refractive power. The second lens group is afocal. While varying the lateral magnification, the object and image positions remain fixed and telecentricity of the lens system (on both the object and image sides) is maintained. Lateral magnification is varied by axially moving lenses in one or more of the first, second, and third lens groups.

27 Claims, 2 Drawing Sheets

VARIABLE-MAGNIFICATION TELECENTRIC OPTICAL SYSTEM

FIELD OF THE INVENTION

This invention pertains to telecentric optical systems that provide variable lateral magnification.

BACKGROUND OF THE INVENTION

Telecentric optical systems have utility in, inter alia, projection/exposure apparatus such as microlithography equipment employing optical projection, surface-positioning, surface inclination, pattern-alignment, and auto-focus systems. For example, reference is made to U.S. Pat. No. 5,510,892 that discloses an optical system for detecting inclination, in a stepper apparatus, of a wafer surface. Examples of telecentric optical systems in the '892 apparatus include lenses 212, 216 and lenses 222, 224.

Other telecentric optical systems are disclosed in, e.g., U.S. Pat. Nos. 4,867,545 and 5,414,561. These optical systems comprise three lens groups and provide variable lateral magnification. The lens groups disclosed in the '545 patent all have positive refractive power, and the lens groups disclosed in the '561 patent have positive-negative-positive refractive power, respectively. Another relevant prior-art system is disclosed in Japanese Laid-Open Patent document No. Hei 7-294811A.

The optical systems disclosed in the foregoing prior art have drawbacks; whenever the magnification of the system is or must be changed without adversely affecting telecentricity, the image point shifts position along the optical axis of the system. Conversely, whenever the magnification is or must be changed while trying to keep the image plane fixed on the optical axis, telecentricity is lost. These problems can arise, for example, during manufacture of a stepper or similar device incorporating one or more such optical systems, wherein minute adjustments may need to be made to the lateral magnification of the optical systems to bring performance of the device within specification. These problems can also arise during normal use of such optical systems wherein the lateral magnification is changed for one purpose or another.

SUMMARY OF THE INVENTION

In view of the foregoing, an object of the present invention is to provide a variable-magnification optical system capable of maintaining telecentricity and a fixed image position whenever the magnification of the optical system is changed. Such optical systems have particular utility for use in devices for optical projection, surface-positioning, surface-inclination detection, pattern alignment, and auto-focus. With such systems, the range of lateral-magnification adjustment required or desired depends upon the use of the system. For example, with optical systems used for determining proper surface positioning, a range of ±1 percent is an adequate range. Other intended uses may require a greater range; e.g., an optical system used for projection of a mask pattern onto a substrate may require a greater range of magnification variability.

According to a preferred embodiment of the present invention, a telecentric lens system is provided that comprises, on an optical axis and from the object side, first, second, and third lens groups. The lens system is telecentric on both the object and image sides. The first and third lens groups each have positive refractive power; on the optical axis the first lens group has a front (objectwise) focal point at which the object is located and the third lens group has a rear (imagewise) focal point at which the image is located. The second lens group is afocal. The lens system is operable to produce, by axial movement of lenses in one or more of the first, second, and third lens groups, a variable lateral magnification of the object while retaining telecentricity and without causing a change in axial position of the front and rear focal points.

When changing lateral magnification in one example embodiment, the first and third lens groups remain stationary and the second lens group, which comprises multiple lens subgroups, is axially movable. It is possible to move some, but not necessarily all, of the lenses in the second lens group. Preferably, the second lens group comprises first, second, and third lens subgroups, that can be positive-negative-positive or negative-positive-negative, respectively.

Movement of one or more lenses in the second lens group is also particularly advantageous for maintaining constancy of the object point and the image point of the lens system upon a change in lateral magnification. Thus, movement of the second lens group can serve to both change the lateral magnification and maintain telecentricity of the lens system.

In another example embodiment, the second and third lens groups are axially movable to change lateral magnification, and at least the second lens group is axially movable to maintain telecentricity and constancy of the object and image points upon a change in lateral magnification.

In any event, whenever the magnification is changed, telecentricity is maintained and the image point remains at a fixed position on the optical axis. In other words, principal rays entering the first lens group from the object are parallel to the optical axis, and principal rays exiting the third lens group to the image plane are parallel to the optical axis.

The invention also encompasses any of various apparatus incorporating a lens system as summarized above. For example, and not intended to be limiting, such apparatus include apparatus for surface detection, surface-inclination measurement and detection, auto focus, and projection.

The foregoing and additional features and advantages of the present invention will be more readily apparent from the following detailed description, which proceeds with reference to the accompanying drawings.

DETAILED DESCRIPTION

As used herein, "telecentric" generally means a parallel relationship between the optical axis of a subject optical system and a principal ray entering or exiting the optical system.

As used herein, a lens that is "substantially afocal" imparts substantially no change to the direction of propagation of rays entering the lens. I.e., with respect to a lens situated on an optical axis, if a flux of rays that are parallel to the axis enters the lens, the rays exiting the lens will also be parallel to the axis. More generally, if D is the diameter of a flux of light having wavelength λ entering the lens, and if θ is the angle of convergence or divergence relative to the optical axis of corresponding light flux exiting the lens, the lens exhibits afocal behavior if:

$$\theta \leq 10\lambda/D$$

Figure 1:
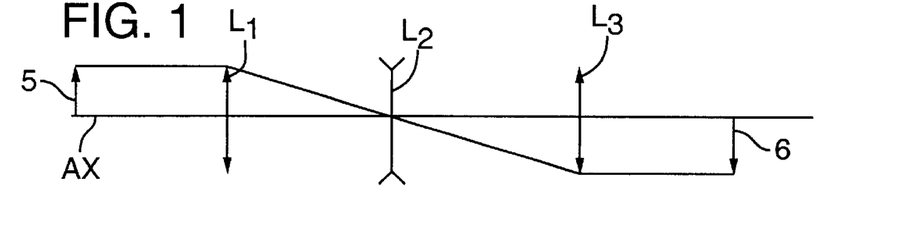
FIG. 1 is an optical diagram showing general aspects of an optical system according to a preferred embodiment of the present invention.

According to general aspects of the present invention as shown in FIG. 1, an optical system is provided, comprising first, second, and third lens groups all situated on an optical axis AX. The first (i.e., most objectwise) lens group $L_1$ has positive refractive power, the second lens group $L_2$ is afocal, and the third lens group $L_3$ has positive refractive power.

Figure 6:
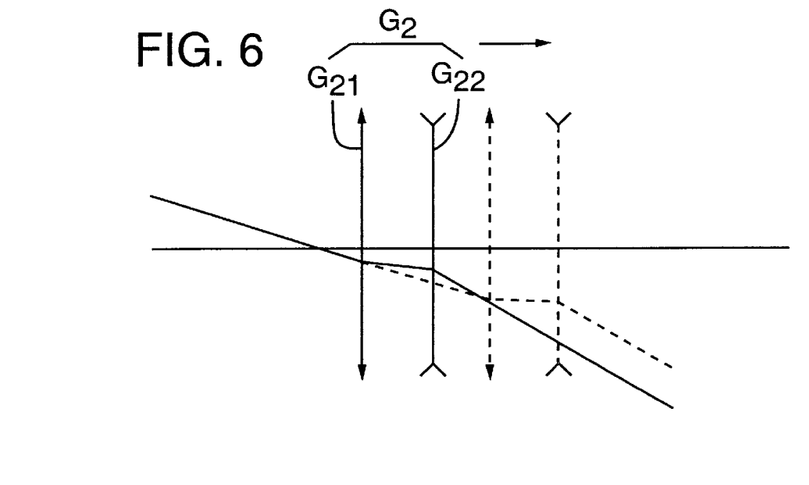
FIG. 6 is an optical diagram showing, with respect to Example Embodiment 3, the effect of axially moving the second lens group.

As a result of the afocal characteristic of the second lens group $L_2$, changing the axial position of the second lens group $L_2$ causes a change in the axial displacement of principal rays passing through the first and third lens groups $L_1$, $L_3$. However, the angle at which, for example, principal rays enter the third lens group $L_3$ from the second lens group $L_2$ is unchanged (FIG. 6).

Optical systems according to the present invention have especial utility in any of various systems for detecting inclination (the degree to which a surface is normal to the optical axis of a projection lens that produces an image on the surface) or degree of focus. Such optical systems are used, for example, in projection-exposure devices such as steppers. By way of example and not intended to be limiting, an optical system according to the present invention can be used as lenses 222–224 and/or lenses 212–216 in U.S. Pat. No. 5,510,892 of Mizutani et al.; as lens 8 and/or lens 19 in U.S. Pat. No. 5,218,415 to Kawashima; as lenses 11–12 and/or lenses 9–10 in U.S. Pat. No. 5,416,562 to Ota et al.; and as lens 7 and/or lens 10 in U.S. Pat. No. 5,118,957 to Kawashima et al., each of which references is incorporated herein by reference.

Example Embodiment 1

Figure 2:
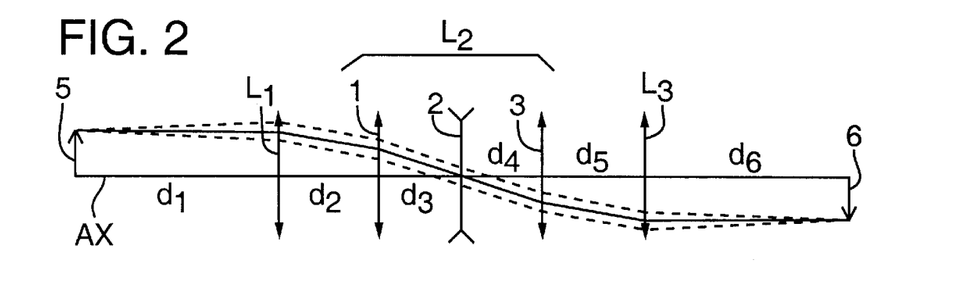
FIG. 2 is an optical diagram showing features of Example Embodiment 1 configured to provide unitary (1×) lateral magnification.

A first example embodiment of an optical system as arranged for unitary (1×) magnification is shown in FIG. 2. In FIG. 2, the ray indicated using a solid line corresponds to the principal ray of the off-axis light flux from the object 5 (i.e., light originating from the object at a position other than the optical axis); rays indicated using the dashed lines represent marginal rays of the off-axis light flux.

Situated on the optical axis AX and proceeding objectwise to imagewise are the object 5, the first lens group $L_1$, the second lens group $L_2$, the third lens group $L_3$, and the image 6. The first lens group $L_1$ and the third lens group $L_3$ have positive refractive power, and the second lens group $L_2$ is afocal (i.e., imparts zero net refraction). The combination of the first, second, and third lens groups is telecentric on both the object and image sides.

The object 5 is situated at the front (i.e., objectwise) focal point of the first lens group $L_1$, and the image 6 is situated on the rear (i.e., imagewise) focal point of the third lens group $L_3$. The "object" 5 can be an actually existing object or an intermediate image focused by an optical system (not shown) situated in front (i.e., to the left; i.e., objectwise) of the "object" 5.

The second lens group $L_2$ comprises, from the object side, a first subgroup $L_{21}$ preferably having positive refractive power, a second subgroup $L_{22}$ preferably having negative refractive power, and a third subgroup $L_{23}$ preferably having positive refractive power. (Alternatively, these three subgroups can have negative, positive, and negative refractive power, respectively. So long as the three subgroups $L_{21}$–$L_{23}$ collectively function as an afocal group, it does not matter whether the three subgroups are positive-negative-positive or negative-positive-negative.)

To facilitate the following discussion, the first lens group $L_1$ is separated from the object 5 by an axial distance $d_1$; the first lens group $L_1$ is separated from the first subgroup $L_{21}$ by an axial distance $d_2$; the first and second subgroups $L_{21}$, $L_{22}$ are separated from each other by an axial distance $d_3$; the second and third subgroups $L_{22}$, $L_{23}$ are separated from each other by an axial distance $d_4$; the third subgroup $L_{23}$ and the third lens group $L_3$ are separated from each other by an axial distance $d_5$; and the third lens group $L_3$ and the image 6 are separated from each other by an axial distance $d_6$.

In this Example Embodiment, the axial distances $d_3$, $d_4$ can be changed; i.e., the first, second, and third subgroups of the second lens group $L_2$ are independently movable to change the lateral magnification of the optical system. Alternatively or in addition, the second lens group $L_2$ as a whole can be axially moved relative to the first and third lens groups $L_1$, $L_3$.

In Example Embodiment 1, representative focal lengths of the lens groups $L_1$–$L_3$ are as follows:

Group $L_1$: $f_1$=100 mm
Group $L_2$: ($f_2$)
  First subgroup $L_{21}$: $f_{21}$=180 mm
  Second subgroup $L_{22}$: $f_{22}$=−70 mm
  Third subgroup $L_{23}$: $f_{23}$=180 mm
Group $L_3$: $f_3$=100 mm At unitary (1×) magnification (FIG. 2), representative axial distances between principal points are as follows for Example Embodiment 1:

Object 5 to lens group $L_1$: $d_1$=100 mm
Lens group $L_1$ to subgroup $L_{21}$: $d_2$=48.571 mm
Subgroup $L_{21}$ to subgroup $L_{22}$: $d_3$=40 mm
Subgroup $L_{22}$ to subgroup $L_{23}$: $d_4$=40 mm
Subgroup $L_{23}$ to lens group $L_3$: $d_5$=48.571 mm
Lens group $L_3$ to image 6: $d_6$=100 mm It will be noted that, at 1× magnification, the lens groups and subgroups in this Example Embodiment are arranged symmetrically on the optical axis. This is a preferred "baseline" configuration for configurations corresponding to magnifications other than 1×. The foregoing provides an overall axial distance from the object 5 to the image 6 of 377.142 mm. The entrance pupil and exit pupil are both infinitely distant.

With the second lens group $L_2$ being an afocal group, the axial distances $d_3$ and $d_4$ are generally determined according to the following:

$$d_3 = f_{21} + 2f_{22}$$

$$d_4 = f_{23} + 2f_{22}$$

The axial distances $d_2$ and $d_5$ are related to the focal lengths of the first subgroup $L_{21}$ and the third subgroup $L_{23}$, respectively, as follows:

$$1/d_3 - 1/(f_1 - d_2) = 1/f_{21}$$

$$1/d_4 - 1/(f_3 - d_5) = 1/f_{23}$$

The axial distances $d_2$ and $d_5$ are determined when the object 5 is placed at the front focal point of the first lens group $L_1$ and the image 6 is focused at the rear focal point of the third lens group $L_3$, such that:

$$d_1 = f_1$$

$$d_6 = f_3$$

When changing the magnification of Example Embodiment 1 from 1× to another magnification, the axial distances between principal points (i.e., distances $d_2$–$d_5$) can be recalculated using the relationships set forth below; wherein a superscript asterisk (*) indicates an unknown corresponding distance after changing magnification. (Thus, the lens groups and subgroups of this Example Embodiment are not arranged symmetrically on the optical axis at magnifications other than 1×.) These axial distances ($d^*_2$–$d^*_5$) can be recalculated for any of various magnifications within the desired variable magnification range of the optical system, and "zoom tracks" can thus be derived for each of the lens groups and subgroups that move during a change in magnification. From the zoom tracks, cams operable to control relative movement of lens groups and subgroups can be configured according to conventional methods to provide the necessary axial movements of the lens groups and subgroups.

In general, with a lateral magnification of b:

$$f_{22} - d^*_4 = b(f_{21} - d^*_3) \tag{1}$$

Since the lens group $L_2$ is an afocal group, $$-1/(f_{21} - d^*_3) - 1/(f_{23} - d^*_4) = 1/f_{22} \tag{2}$$

In order to keep the axial distance between the object and image constant (and using data as set forth above), $$d_1 + d^*_2 + d^*_3 + d_4 + d^*_5 + d_6 = 377.142 \text{ mm} \tag{3}$$

To find $d^*_5$, a lens equation involving the subgroup 1 is used:

$$-1/(f_1 - d^*_2) + 1/X = 1/f_{21} \tag{4}$$

wherein X is, for an off-axis principal ray, the axial distance from the principal point of the first subgroup $L_{21}$ to the image point of the first subgroup $L_{21}$. To find $d^*_3$ and $d^*_4$, a lens equation involving the subgroup $L_{22}$ is used:

$$-1/(f_1 - d^*_3) + 1/(Y - d^*_4) = 1/f_{22} \tag{5}$$

wherein Y is, for an off-axis principal ray, the axial distance from the principal point of the third subgroup $L_{23}$ to the object point of the third subgroup $L_{23}$. To find $d^*_5$, a lens equation involving the third subgroup $L_{23}$ is used:

$$-1/(f_3 - d^*_5) + 1/Y = 1/f_{23} \tag{6}$$

The above formulae contain six unknowns $d^*_2$, $d^*_3$, $d^*_4$, $d^*_5$, X and Y. At a magnification of 0.7×, calculation of the $d^*$ values yields the following results:

$d^*_2 = 80.765$ mm $d^*_3 = 10$ mm $d^*_4 = 61$ mm $d^*_5 = 25.377$ mm

Figure 3:
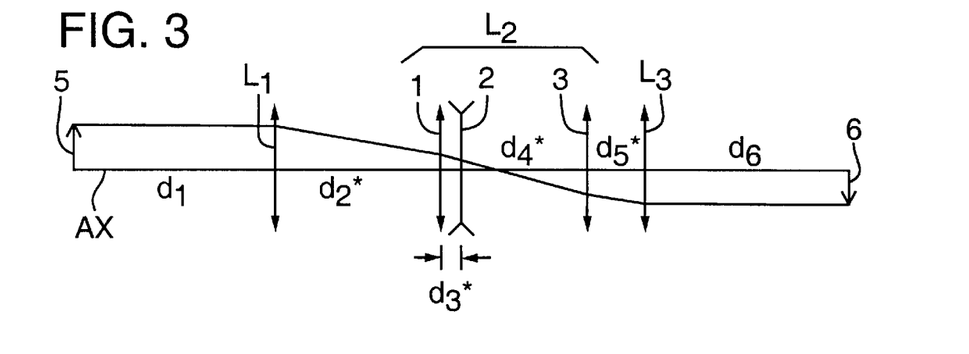
FIG. 3 is an optical diagram showing Example Embodiment 1 configured to provide 0.7× lateral magnification.

The foregoing axial distances are shown in proportional relationship in FIG. 3 (for a lateral magnification of 0.7× rather than 1×). In FIG. 3, the object-to-image axial distance is unchanged at 377.142 mm. In addition, the entrance pupil and exit pupil remain infinitely distant on the object side and the image side, respectively.

As another example, if $d^*_2 = 25.377$ mm, $d^*_3 = 61$ mm, $d^*_4 = 10$ mm, and $d^*_5 = 80.765$ mm, then the lateral magnification is 1.42×. Thus, this Example Embodiment is capable of a zooming range of at least 0.7×–1.42×.

The actual range of any optical system according to this invention is limited by physical constraints: touching of adjacent lens groups or subgroups typically prevents further adjustment.

Example Embodiment 2

Figure 4:
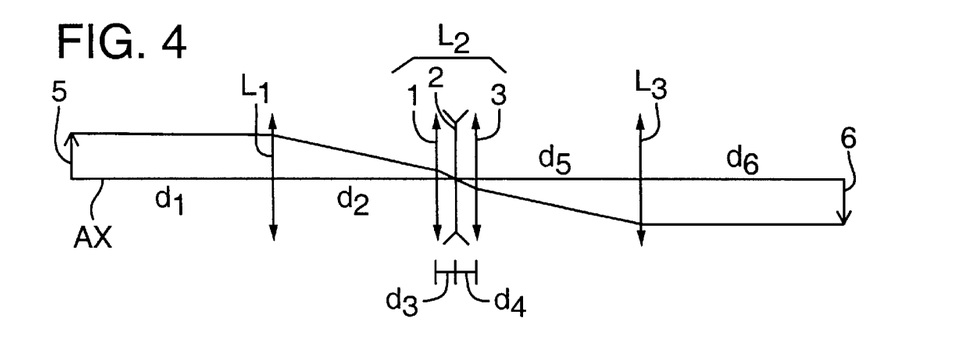
FIG. 4 is an optical diagram showing features of Example Embodiment 2 configured to provide unitary lateral magnification.

Example Embodiment 2 is shown in FIG. 4, having the following focal lengths:

Group $L_1$: $f_1 = 100$ mm

Group $L_2$: ($f_2$)
First subgroup $L_{21}$: $f_{21} = 1000$ mm
Second subgroup $L_{22}$: $f_{22} = -495$ mm
Third subgroup $L_{23}$: $f_{23} = 1000$ mm Group $L_3$: $f_3 = 100$ mm At unitary (1×) magnification, the axial distances for this Example Embodiment 2 are as follows:

$d_1 = 100$ mm $d_2 = 89.899$ mm $d_3 = 10$ mm $d_4 = 10$ mm $d_5 = 89.899$ mm $d_6 = 100$ mm Thus, at a magnification of 1×, the overall length of this Example Embodiment 2 is 399.798 mm, and the entrance pupil and the exit pupil are infinitely distant. The rear focal point of the first lens group $L_1$ and the front focal point of the third lens group $L_3$ are coincident at an axial location at which the second lens group $L_2$ is axially situated.

If one were to move the subgroup $L_{22}$ a 5-mm distance to the left in FIG. 4 while keeping the other subgroups $L_{21}$, $L_{23}$ stationary on the axis, the distances $d_2$ and $d_5$ would change, and the magnification would be 0.99×. An example of when such small magnification change may be required is an instance in which the subject optical system is used in a stepper machine and "fine tuning" of the optical system is required in order to bring performance of the stepper to within specification.

In any event, moving the subgroup $L_{22}$ of this Example Embodiment as described above yields a focal-point shift of 0.5 μm and a pupil position of 39895 mm. That is, a change in magnification of approximately 1% yields a negligible image shift while essentially maintaining telecentricity. Thus, it is possible to fine-tune magnification by moving only the subgroup $L_{22}$ while maintaining telecentricity and a fixed object-to-image distance.

Example Embodiments 1 and 2 show that axially moving one or more of the first, second, and third subgroups of the second lens group $L_2$ achieves a change in magnification while substantially preventing image shifting. In order to better maintain telecentricity with a change in magnification, all of the lens subgroups in the second lens group $L_2$ can be axially moved together.

In Example Embodiments 1 and 2, the afocal second lens group $L_2$ is arranged relative to the first and third lens groups $L_1$, $L_3$ based upon an optical configuration in which the rear (image side) focal-point position of the first lens group $L_1$ is preferably coincident with the front (object side) focal-point position of the third lens group $L_3$. As a result of telecentricity on the object side, light flux from the object 5 propagating from the first lens group $L_1$ toward the second lens group $L_2$ is parallel to the optical axis. Since the second lens group $L_2$ is afocal, light flux from the second lens group $L_2$ toward the third lens group $L_3$ is also parallel to the optical axis. Consequently, the light flux from the third lens group $L_3$ converges at the rear focal point of the third lens group $L_3$, which rear focal point is coincident with the axial position of the image 6. Even if the angular magnification of the second lens group $L_2$ is changed, the light flux from the second lens group $L_2$ toward the third lens group $L_3$ remains parallel; thus, the position of the image 6 on the optical axis does not change.

Further with respect to Example Embodiments 1 and 2, the off-axis principal ray from the object (which ray passes through the first lens group $L_1$ and the second lens group $L_2$) exits the second lens group $L_2$ and propagates toward the third lens group $L_3$ at an angle (relative to the optical axis) corresponding to the angular magnification of the second lens group $L_2$. The size of the image 6 is determined by that angle. I.e., there is a correlation between the angular magnification of the second lens group $L_2$ and the size of the image 6. So long as this off-axis principal ray (that has passed through the second lens group $L_2$) passes through the object-side focal-point position of the third lens group $L_3$, telecentricity remains good on the image side. Thus, when changing magnification, appropriately moving the second lens group $L_2$ along the optical axis ensures that the principal ray from the second lens group $L_2$ passes through the object-side focal-point position of the third lens group $L_3$.

Example Embodiment 3

Figure 5:
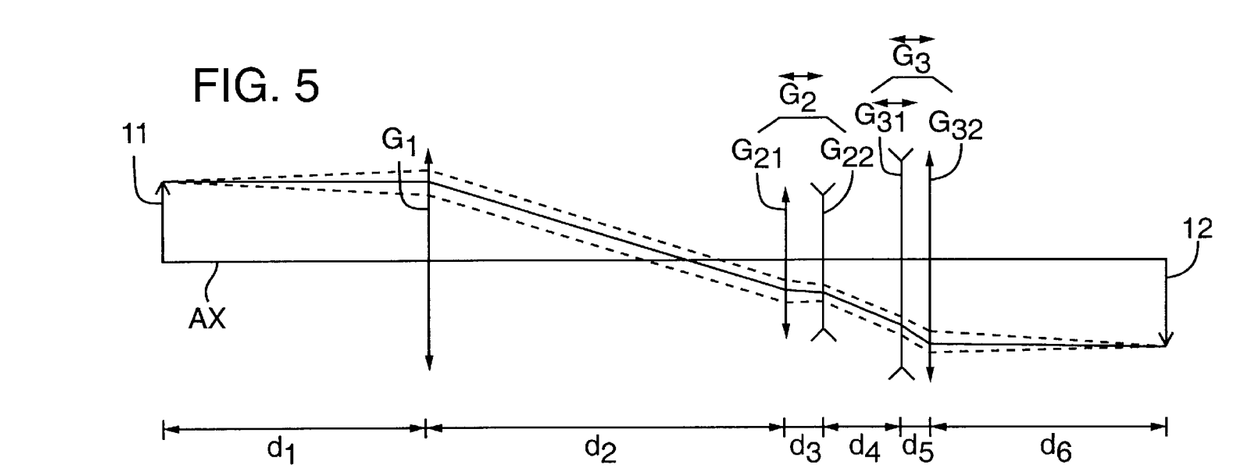
FIG. 5 is an optical diagram showing features of Example Embodiment 3 configured to provide unitary magnification.

An optical system according to this example embodiment is shown in FIG. 5. In order from the object side (left) along the optical axis AX, are situated the object 11, a first lens group $G_1$ having positive refractive power, an afocal second lens group $G_2$, a third lens group $G_3$ having positive refractive power, and an image 12. In FIG. 5, the dashed lines indicate marginal rays of the off-axis light flux, and the solid line represents a principal ray.

The afocal second lens group $G_2$ comprises a first subgroup $G_{21}$ having positive refractive power, and a second subgroup $G_{22}$ having negative refractive power. The second lens group $G_2$ can be axially moved in its entirety (FIG. 6).

The third lens group $G_3$ comprises a first subgroup $G_{31}$ having negative refractive power, and a second subgroup $G_{32}$ having positive refractive power. For changing the lateral magnification of the optical system, the third lens group $G_3$ can be axially moved in its entirety; alternatively, the first and second subgroups $G_{31}$, $G_{32}$ can be individually moved.

The object 11 can be an actual object or an intermediate image produced by an optical system (not shown) placed in front of (i.e., to the left of) it.

At 1× magnification, both the object and image sides of the optical system are telecentric; the image 12 can be formed at the imagewise focal-point position of the third lens group $G_3$ by situating the object 11 at the front focal-point position of the first lens group $G_1$. Also, at 1× magnification, the focal lengths of the first lens group $G_1$ and the third lens group $G_3$ ($f_1$, $f_3$, respectively) can be equal. The overall lateral magnification of the optical system changes as the focal length of either the first lens group $G_1$ or the third lens group $G_3$ is changed. (The focal length of the third lens group $G_3$ can be changed by changing the axial distance between the two subgroups $G_{31}$, $G_{32}$.)

If one were to simply change the focal length of the third lens group $G_3$, the position of the image 12 on the optical axis AX would change and telecentricity would be lost. If the third lens group $G_3$ were then axially moved, the position of the image 12 on the optical axis could be brought back to the original position; however, image-side telecentricity would still be poor. To rectify this situation without changing the axial position of the image 12, the inclination of the principal ray on the image side can be changed. This can be done by changing the inclination of the principal ray incident to the third lens group $G_3$ without changing the axial ray incident to the third lens group $G_3$.

To such end, the afocal second lens group $G_2$ is operable to pass axial rays, entering the group as parallel rays, as parallel rays (i.e., to pass rays that are unchanged with respect to their parallel status). Since the axial rays between the first lens group $G_1$ and the third lens group $G_3$ are parallel to the optical axis, the axial position of the image 12 does not change as a result of the presence or axial movement of the second lens group $G_2$.

If the afocal second lens group $G_2$ has an angular magnification of 1, even if the second lens group $G_2$ is moved on the optical axis between the first and third lens groups $G_1$, $G_3$, the inclination of the principal ray exiting the second lens group $G_2$ remains constant. On the other hand, if the afocal second lens group $G_2$ does not have an angular magnification of unity, the height of rays entering the third lens group $G_3$ will change according to the axial position of the afocal second lens group $G_2$ (FIG. 6).

Preferably, the afocal second lens group $G_2$ is positioned on the optical axis such that a reverse-direction principal ray from the image 12, which proceeds parallel to the optical axis when the principal ray is traced from the image side, intersects the forward-direction principal ray traced from the object side.

Thus, it is possible, by moving the third lens group $G_3$ as a unit (i.e., keeping $d_5$ constant; FIG. 5), to change the lateral magnification of the image 12 without causing any significant shift of the axial position of the image 12.

As a representative example, and not intended to be limiting in any way, the focal lengths of each of the lens groups are as follows:

Lens group $G_1$: $f_1$=100 mm
Lens group $G_2$: ($f_2$)
   Subgroup $G_{21}$: $f_{21}$=100 mm
   Subgroup $G_{22}$: $f_{22}$=−85 mm
Lens group $G_3$: ($f_3$)
   Subgroup $G_{31}$: $f_{31}$=−166.6 mm
   Subgroup $G_{32}$: $f_{32}$=60 mm To provide unitary (1×) lateral magnification, representative axial distances between principal points of the foregoing lens groups and subgroups are as follows:

Object 11 to group $G_1$: $d_1$=100 mm
Group $G_1$ to subgroup $G_{21}$: $d_2$=136.91 mm
Subgroup $G_{21}$ to subgroup $G_{22}$: $d_3$=15 mm
Subgroup $G_{22}$ to subgroup $G_{31}$: $d_4$=30 mm
Subgroup $G_{31}$ to subgroup $G_{32}$: $d_5$=11 mm
Subgroup $G_{32}$ to image 12: $d_6$=90.61 mm With respect to the foregoing distances, $d_1$ was established so that an axial ray from the object 11 is parallel to the optical axis after passing through the first lens group $G_1$. The focal lengths $f_{21}$ and $f_{22}$ and the distance $d_3$ were established so that the angular magnification of the second lens group $G_2$ is 0.85 (by way of example only and not intended to be limiting). I.e., the second lens group $G_2$ can be functionally regarded as an afocal converter having an angular magnification of 0.85 situated objectwise of the third lens group $G_3$. Consequently, if $f_1$ is equal to the combined focal lengths ($f_{2,3}$) of the second and third lens groups $G_2$, $G_3$, then the magnification of the overall optical system (i.e., of all three lens groups) is unitary. In order to make the combined focal length $f_{2,3}$ of the second and third lens groups $G_2$, $G_3$ equal to 100 mm, $f_3$ can be 85 mm. Since $f_{32}$ and $d_5$ are known, $f_{31}$ can be established so that $f_3 = 85$ mm.

The distance $d_2$ was determined as follows: on an optical diagram tracing principal and axial rays for this Example Embodiment, the object 11 and first lens group $G_1$ are moved as a unit and the second and third lens groups $G_2$, $G_3$ are moved as a unit so as to match up, within $d_2$, the principal ray extending imagewise with the principal ray extending objectwise. In such an instance, the values of $f_1$, $f_{22}$, $f_{31}$, $f_{32}$, $d_1$, $d_3$, $d_4$, and $d_5$ are known.

After determining $d_2$, the distance $d_6$ can be determined by tracing an axial ray imagewise from the object 11 through the optical system.

Upon performing the foregoing procedure, the overall length was determined to be 383.52 mm=$d_1+d_2+d_3+d_4+d_5+d_6$. Both the entrance and exit pupils are situated at infinity relative to the optical system.

Next, the first subgroup $G_{31}$ of the third lens group $G_3$ was moved relative to the subgroup $G_{32}$ so as to reduce $d_5$ by 2 mm. The following values were established by moving lens groups $G_2$ and $G_3$:

$d_1 = 100$ mm $d_2 = 127.5$ mm $d_3 = 15$ mm $d_4 = 40.88$ mm $d_5 = 9$ mm $d_6 = 91.14$ mm

The foregoing values were determined as follows: Based on the 2-mm reduction in the distance $d_5$, the focal length of lens group $G_3$ was determined to be 86.47 mm (by calculating $(f_3)^{-1} = (f_{31})^{-1} + (f_{32})^{-1} - d_5(f_{31} \cdot f_{32})^{-1}$. In order to maintain the position of the image 12 relative to the optical axis, the distance $d_6$ was determined by making coincident the rear (imagewise) focal point of the third lens group $G_3$ overall and the original position of the image 12.

The angular magnification of the second lens group $G_2$ is constant regardless of the axial position of the second lens group. As stated above, the second lens group $G_2$ functions as an afocal converter with an angular magnification of 0.85 mounted in front of the third lens group $G_3$. Consequently, the combined focal length $f_{2,3}$ of the second and third lens groups $G_2$, $G_3$ is $86.47(0.85)^{-1} = 101.7$ mm. Since the optical system overall must be telecentric on both sides after changing magnification, the rear focal-point position of the first lens group $G_1$ must be matched with the front focal-point position of the combined second and third lens groups. The lateral magnification in such a type of optical system having matched focal-point positions is the ratio between f1 and the combined focal length $f_{2,3}$ of the second and third lens groups $G_2$, $G_3$.

As a result of the foregoing, the lateral magnification after the magnification change is 1.017×. I.e., a principal ray entering the optical system from the object side has a height on the image side of 1.017× larger than originally. Assuming telecentricity, a reverse-direction principal ray extending objectwise through the third lens group $G_3$ from a position on the image that is 1.017× the height of the corresponding point on the original (i.e., pre-magnification change) image enters the third lens group $G_3$ parallel to the optical axis. The object 11 and the first lens group $G_1$ is moved as a unit on the optical axis relative to the second and third lens groups and the image. A principal ray originating at the object and extending imagewise through the first lens group $G_1$ is made coincident on the optical axis with the reverse-direction principal ray.

The distance $d_3$ is constant in this Example Embodiment. The distance $d_2$ was found by overlaying a principal ray extending objectwise from the image and a principal ray extending imagewise from the object. As a result, $d_1$, $d_2$, $d_3$, $d_5$ and $d_6$ are known. The distance $d_4$ is readily determined since the sum of all six axial distances is unchanged (383.52 mm) even with a change in magnification from 1× to 1.017×. Also, the entrance and exit pupils remain infinitely distant.

In this Example Embodiment, in order to be able to change the lateral magnification of the optical system without changing the image position and while preserving telecentricity, the third lens group $G_3$, subgroup 1 in the third lens group $G_{31}$, and the second lens group $G_2$ are each axially movable independently.

In this Example Embodiment as shown in FIG. 5, the afocal second lens group $G_2$ preferably comprises a first subgroup $G_{21}$ having positive refractive power and a second subgroup $G_{22}$ having negative refractive power. Alternatively, the second lens group $G_2$ can be an afocal group having a magnification of other than unitary, and can have other configurations than as shown. For example, the second lens group $G_2$ can comprise (a) a negative first subgroup $G_{21}$ and a positive second subgroup $G_{22}$; (b) a positive first subgroup $G_{21}$, a negative second subgroup $G_{22}$, and a positive third subgroup $G_{23}$; and (c) a negative first subgroup $G_{21}$, a positive second subgroup $G_{22}$, and a negative third subgroup $G_{23}$.

In this Example Embodiment as shown in FIG. 5, the third lens group $G_3$ preferably comprises a first subgroup $G_{31}$ having negative refractive power, and a second subgroup $G_{32}$ having positive refractive power. However, the third lens group $G_3$ is not limited to such a structure. As long as $f_3$ can be changed, some other structure (e.g., a positive first subgroup $G_{31}$ and a negative second subgroup $G_{32}$) can also be employed in the third lens group.

In this Example Embodiment, the second lens group $G_2$ is situated on the image side of the rear focal point of the first lens group $G_1$. It is also possible to situate the second lens group $G_2$ on the object side of the focal point of the first lens group $G_1$. Also, in this Example Embodiment the first subgroup $G_{31}$ of the third lens group is independently movable along the optical axis to change the focal length of the third lens group $G_3$. As an alternative, since the axial position of the image on the optical axis remains constant, the second subgroup $G_{32}$ can be independently movable along the axis. Furthermore, in this Example Embodiment, either the entire third lens group $G_3$ or some of the lenses in the third lens group can be axially movable. As an alternative to moving the third lens group $G_3$ or a portion thereof, the first lens group $G_1$ or a portion thereof can be axially movable (since the first lens group $G_1$ in this Example Embodiment is preferably structured similarly to the third lens group $G_3$). These alternatives are a reflection of the possibility of simply reversing the positions of the object and image. In other words, this Example Embodiment represents an arrangement in which an object can be placed at the position of the image 12 (FIG. 5) and an image can thus be formed at the position of the object 11. With such an arrangement, the first lens group $G_1$, like the third lens group $G_3$, is constructed of multiple lenses, and the focal length of the first lens group itself can be changed by moving a portion of the multiple lens groups comprising the optical system.

Therefore, a magnification change can be effected by axially moving either the first or the third lens group.

Whereas the invention has been described in connection with a number of example embodiments, it will be understood that the invention is not limited to those embodiments. On the contrary, the invention is intended to encompass all alternatives, modifications, and equivalents as may be included within the spirit and scope of the invention as defined by the appended claims.

What is claimed is:

1. A telecentric lens system, comprising on an optical axis from an object side to an image side:
    (a) first, second, and third lens groups, the first and third lens groups each having positive refractive power, the second lens group being afocal, and the first, second, and third lens groups each comprising at least one lens;
    (b) the first lens group having a front focal point on the optical axis and the third leans group having a rear focal point on the optical axis, wherein the telecentric lens system is operable to form an image, at the rear focal point, of an object located at the front focal point;
    (c) the lens system being telecentric on both the object and images sides;
    (d) at least one lens in the second lens group being movable along the optical axis for changing a lateral magnification of an object as imaged by the lens system, and the lenses in the first and third lens groups being fixed relative to the object when changing the lateral magnification; and
    (e) the lens system being operable to produce the variable lateral magnification of the object while retaining telecentricity and without causing a change in axial position of the front and rear focal points.

2. The lens system of claim 1, wherein the second lens group comprises first, second, and third subgroups of lenses.

3. The lens system of claim 2, wherein the first and third subgroups have positive refractive power and the second subgroup has negative refractive power.

4. The lens system of claim 2, wherein the first and third subgroups have negative refractive power and the second subgroup has positive refractive power.

5. The lens system of claim 2, wherein the first and second subgroups, and the second and third subgroups, each have an axial spacing therebetween, the axial spacing between the first and second subgroups and the axial spacing between the second and third subgroups being independently variable to vary the lateral magnification of the lens system.

6. The lens system of claim 2, wherein the third lens groups is also axially movable to vary the lateral magnification of the lens system and the second lens group comprises at least one lens that is axially movable to retain telecentricity of the lens system upon a change in lateral magnification.

7. The lens system of claim 1, wherein the second lens group is axially movable to achieve variable lateral magnification of an object.

8. The lens system of claim 1, wherein at least one of the first and third lens groups comprises lenses that are axially movable independently of the second lens group for changing the lateral magnification of the lens system.

9. The lens system of claim 1, wherein at least one lens in either of the first and third lens groups is axially movable to change the lateral magnification of the lens system.

10. The lens system of claim 1, wherein the second lens group comprises, objectwise to imagewise, a positive lens and a negative lens, and the third lens group comprises, objectwise to imagewise, a negative lens and a positive lens.

11. The lens system of claim 10, wherein one or more of the lenses in the third lens group, or the third lens group as a whole, are axially movable to change the lateral magnification of the lens system.

12. The lens system of claim 11, wherein the second lens group is axially movable as a whole to maintain telecentricity upon a change in lateral magnification.

13. A surface-detection apparatus, comprising:
    a light source;
    an illumination optical system disposed between the light source and a surface to be detected;
    a detector; and
    a light-receiving optical system disposed between the surface and the detector, wherein at least one of the illumination optical system and light-receiving optical system comprises the lens system of claim 1.

14. A surface-inclination detecting apparatus, comprising:
    a light source;
    an illumination optical system disposed between the light source and a surface having an inclination to be detected;
    a detector; and
    a light-receiving optical system disposed between the surface and the detector, wherein at least one of the illumination optical system and the light-receiving optical system comprises the lens system of claim 1.

15. An exposure apparatus, comprising:
    a first light source;
    a projection optical system;
    a first stage disposed between the first light source and the projection optical system, the first stage being for supporting a mask;
    a second stage, disposed at a position where light from the first light source via the projection optical system is converged, the second stage being for supporting a photosensitive substrate;
    a second light source;
    an illumination optical system disposed between the second light source and the wafer, the illumination optical system having an optical axis inclined relative to the photosensitive substrate;
    a detector; and
    a light-receiving optical system disposed between the wafer and the detector, the light-receiving optical system having an optical axis inclined to the photosensitive substrate, wherein at least one of the illumination optical system and the light-receiving optical system comprising the lens system of claim 1.

16. A telecentric lens system, comprising on an optical axis from an object side to an image side:
    (a) first, second, and third lens groups, the first and third lens groups each having positive refractive power, and the second lens group being afocal;
    (b) the lens system being telecentric on both the object and image sides; and
    (c) the first lens group having a front focal point on the optical axis and the third lens group having a rear focal point on the optical axis, wherein the telecentric lens system is operable to form an image, at the rear focal point, of an object located at the front focal point;
    (d) the third lens group being axially movable to change the lateral magnification of the lens system; and
    (e) the second lens group comprising first, second, and third lens subgroups independently movable on the optical axis to maintain, upon a change in lateral magnification of the lens system, telecentricity and constancy of the positions of the front and rear focal points.

17. The lens system of claim 16, wherein the second lens group comprises, objectwise to imagewise, a positive lens, a negative lens, and a positive lens.

18. A surface-detection apparatus, comprising:
a light source;
an illumination optical system disposed between the light source and a surface to be detected;
a detector; and
a light-receiving optical system disposed between the surface and the detector, wherein at least one of the illumination optical system and the light-receiving optical system comprises the lens system of claim 16.

19. A surface-inclination detecting apparatus, comprising:
a light source;
an illumination optical system disposed between the light source and a surface having an inclination to be detected;
a detector; and
a light-receiving optical system disposed between the surface and the detector, wherein at least one of the illumination optical system and the light-receiving optical system comprises the lens system of claim 16.

20. An exposure apparatus, comprising:
a first light source;
a projection optical system;
a first stage disposed between the first light source and the projection optical system, the first stage being for supporting a mask;
a second stage, disposed at a position where light from the first light source via the projection optical system is converged, the second stage being for supporting a photosensitive substrate;
a second light source;
an illumination optical system disposed between the second light source and the wafer, the illumination optical system having an optical axis inclined relative to the photosensitive substrate;
a detector; and
a light-receiving optical system disposed between the wafer and the detector, the light-receiving optical system having an optical axis inclined to the photosensitive substrate, wherein at least one of the illumination optical system and the light-receiving optical system comprising the lens system of claim 16.

21. A telecentric lens system, comprising on an optical axis from an object side to an image side:
(a) first, second, and third lens groups, the first and third lens groups each having positive refractive power, and the second lens group being afocal;
(b) the lens system being telecentric on both the object and image sides; and
(c) the first lens group having a front focal point on the optical axis and the third lens group having a rear focal point on the optical axis, wherein the telecentric lens system is operable to form an image, at the rear focal point, of an object located at the front focal point;
(d) the third lens group comprising first and second subgroups of lenses and being axially movable to change the lateral magnification of the lens system; and
(e) the second lens group comprising first and second subgroups of lenses and being independently movable on the optical axis to maintain, upon a change in lateral magnification of the lens system, telecentricity and constancy of the positions of the front and rear focal points.

22. The lens system of claim 21, wherein:
(a) the second lens group comprises, objectwise to imagewise, a positive lens and a negative lens that are collectively movable on the optical axis; and
(b) the third lens group comprises, objectwise to imagewise, a negative lens and a positive lens that are axially movable individually or collectively.

23. A surface-detection apparatus, comprising:
a light source;
an illumination optical system disposed between the light source and a surface to be detected;
a detector; and
a light-receiving optical system disposed between the surface and the detector, wherein at least one of the illumination optical system and the light-receiving optical system comprises the lens system of claim 21.

24. A surface-inclination detecting apparatus, comprising:
a light source;
an illumination optical system disposed between the light source and a surface having an inclination to be detected;
a detector; and
a light-receiving optical system disposed between the surface and the detector, wherein at least one of the illumination optical system and the light-receiving optical system comprises the lens system of claim 21.

25. An exposure apparatus, comprising:
a first light source;
a projection optical system;
a first stage disposed between the first light source and the projection optical system, the first stage being for supporting a mask;
a second stage, disposed at a position where light from the first light source via the projection optical system is converged, the second stage being for supporting a photosensitive substrate;
a second light source;
an illumination optical system disposed between the second light source and the wafer, the illumination optical system having an optical axis inclined relative to the photosensitive substrate;
a detector; and
a light-receiving optical system disposed between the wafer and the detector, the light-receiving optical system having an optical axis inclined to the photosensitive substrate, wherein at least one of the illumination optical system and the light-receiving optical system comprising the lens system of claim 21.

26. A telecentric lens system, comprising on an optical axis from an object side to an image side:
(a) first, second, and third lens groups, the first and third lens groups each having positive refractive power, and the second lens group being afocal and comprising first, second, and third subgroups of lenses, the first and third subgroups having positive refractive power and the second subgroup having negative refractive power;
(b) the first lens group having a front focal point on the optical axis and the third lens group having a rear focal point on the optical axis, wherein the telecentric lens system is operable to form an image, at the rear focal point, of an object located at the front focal point;

(c) the lens system being telecentric on both the object and image sides; and (d) the lens system being operable to produce, by axial movement of lenses in one or more of the first, second, and third lens groups, a variable lateral magnification of an object while retaining telecentricity of the lens system and without causing a change in axial position of the front and rear focal points.

27. The lens system of claim 26, wherein the first and second subgroups, and the second and third subgroups, each have an axial spacing therebetween, the axial spacing between the first and second subgroups and the axial spacing between the second and third subgroups being independently variable to vary the lateral magnification of the lens system.

* * * * *

UNITED STATES PATENT AND TRADEMARK OFFICE
CERTIFICATE OF CORRECTION

PATENT NO. : 5,805,347

DATED : September 8, 1998

INVENTOR(S) : MIZUTANI ET AL.

It is certified that error appears in the above-indentified patent and that said Letters Patent is hereby corrected as shown below:

Column 8, line 43, "$f_2 = 100$ mm" should be --$f_{21} = 100$ mm--.

Signed and Sealed this

Twelfth Day of October, 1999

Attest:

Attesting Officer

Q. TODD DICKINSON

Acting Commissioner of Patents and Trademarks